(12) United States Patent
Broeren et al.

(10) Patent No.: US 9,073,418 B2
(45) Date of Patent: Jul. 7, 2015

(54) ROLLO ASSEMBLY AND OPEN ROOF CONSTRUCTION PROVIDED THEREWITH

(71) Applicant: Inalfa Roof Systems Group B.V., Venray (NL)

(72) Inventors: Mark Broeren, Oostrum (NL); Marinus Wilhelmus Maria Nabuurs, Overloon (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/076,819

(22) Filed: Nov. 11, 2013

(65) Prior Publication Data

US 2014/0132026 A1 May 15, 2014

(30) Foreign Application Priority Data

Nov. 12, 2012 (EP) .................... 12192208

(51) Int. Cl.
*B60J 7/06* (2006.01)
*B60J 1/20* (2006.01)
*B60J 7/00* (2006.01)

(52) U.S. Cl.
CPC .............. *B60J 1/2038* (2013.01); *B60J 1/2044* (2013.01); *B60J 7/0015* (2013.01)

(58) Field of Classification Search
CPC .......... B60J 7/067; B60J 7/0015; B60J 10/12; B60J 1/2013; B60J 1/2063; B60J 1/2038; B60J 1/2044
USPC ............ 296/214, 98, 37.16; 160/23.1, 370.22
See application file for complete search history.

(56) References Cited

U.S. PATENT DOCUMENTS

| | | | | |
|---|---|---|---|---|
| 3,146,824 A | * | 9/1964 | Veilleux | 160/23.1 |
| 3,965,960 A | * | 6/1976 | Massey | 160/295 |
| 4,458,739 A | * | 7/1984 | Murray et al. | 160/23.1 |
| 4,872,722 A | * | 10/1989 | Farmont | 296/214 |
| 5,505,244 A | * | 4/1996 | Thumann | 160/23.1 |
| 5,762,393 A | * | 6/1998 | Darmas, Sr. | 296/98 |

(Continued)

FOREIGN PATENT DOCUMENTS

| | | |
|---|---|---|
| DE | 20205630 U1 | 6/2002 |
| DE | 102006000878 A1 | 3/2007 |

(Continued)

OTHER PUBLICATIONS

European Search Report for EP 12172208. Apr. 4, 2013, Munich.

*Primary Examiner* — Dennis H Pedder
(74) *Attorney, Agent, or Firm* — Steven M. Koehler; Westman, Champlin & Koehler, P.A.

(57) ABSTRACT

A rollo assembly is provided, comprising a rotatable winding shaft and a flexible sun screen having forward and rearward ends. The rearward end of the sun screen can be wound on or off the winding shaft and the forward end of the sun screen is provided with an operating beam. The winding shaft is received in a housing that comprises an opening for the passage of the sun screen with a length at least substantially corresponding with a transversal width of the sun screen. The operating beam at its side facing towards the housing carries a sealing member extending above the sun screen transversally over a length at least substantially corresponding with the length of the opening in the housing, for engaging the housing when the sun screen is maximally wound onto the winding shaft.

15 Claims, 2 Drawing Sheets

(56) References Cited

U.S. PATENT DOCUMENTS 5,862,851 A * 1/1999 Stoebich et al. ........... 160/121.1
7,438,111 B2 * 10/2008 Grimes et al. ............... 160/23.1

FOREIGN PATENT DOCUMENTS

EP 0394123 * 10/1990
EP 0926007 * 6/1999

* cited by examiner

ROLLO ASSEMBLY AND OPEN ROOF CONSTRUCTION PROVIDED THEREWITH

BACKGROUND

The discussion below is merely provided for general background information and is not intended to be used as an aid in determining the scope of the claimed subject matter.

Aspects of the invention relate to a rollo assembly, comprising a rotatable winding shaft, a flexible sun screen having forward and rearward ends, wherein the rearward end of the sun screen can be wound on or off the winding shaft and wherein the forward end of the sun screen is provided with an operating beam and wherein the winding shaft is received in a housing that comprises an opening for the passage of the sun screen with a length at least substantially corresponding with a transversal width of the sun screen.

The housing of such a rollo assembly is provided for a number of reasons. For example, it hides the winding shaft (with any mechanism belonging thereto) from sight and it provides constructional means for mounting the winding shaft. An other very important function of the housing is to protect the winding shaft and the sun screen wound thereon against environmental influences, such as impacts (which might cause damage) and dust (which may lead to an unattractive appearance of the assembly, especially the sun screen, and which even may lead to malfunctions of the rollo assembly). With respect to this last function, however, the housing not always is capable of preventing an accumulation of dust on top of the sun screen, especially when applied in an open roof construction of a vehicle with a roof opening closable by a movable panel. Due to aerodynamic effects, in combination with the specific position of the housing in a low pressure zone when the panel is in a position for opening the roof opening, dust will directly and in a concentrated manner settle on the sun screen between the housing and the operating beam (and possibly will enter the housing through the opening). But also dust settling on top of the housing may slide down along the housing towards the sun screen between the housing and sun screen. When the sun screen is maximally wound onto the winding shaft the operating beam may further contribute to this effect. When the sun screen is in a position maximally wound off from the winding shaft, this effect will be far more less because the dust will be distributed over a larger surface and therefore the visual impact will be less.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention is to provide an improved rollo assembly of the type referred to above.

Thus, in accordance with a first aspect of the present invention a rollo assembly includes an operating beam at its side facing towards the housing carries a sealing member extending above the sun screen transversally over a length at least substantially corresponding with the length of the opening in the housing, for engaging the housing when the sun screen is maximally wound onto the winding shaft.

When the sun screen is maximally wound onto the winding shaft the sealing member engages the housing above the opening (and substantially over the entire length of said opening). As a result dust is effectively prevented from reaching the sun screen between the housing and operating beam and the sun screen, once moved towards its open position (unwound from the winding shaft) remains clean.

In one embodiment of the rollo assembly, the sealing member basically comprises the extreme end of a part of the sun screen extending around the operating beam, which extreme end substantially extends in a direction towards the housing.

In such an embodiment the sun screen itself is used to provide the sealing member, such that there is no need to provide an additional member for that purpose. The extreme end extends substantially towards the housing and as such is capable of engaging the housing in an effective manner.

Said extreme part generally will have the ability to deform for achieving the best engagement between the housing and said extreme end. Such a deformation may be the result of said extreme end itself being flexible or of a deformable connection between said extreme end and the remainder of the sun screen (or any other part, for example the operating beam, supporting said extreme end).

The extreme end of said part of the sun screen can extend in an upwardly inclined manner. As a result said extreme part not only prevents the dust from reaching the sun screen but also leads the dust away from the housing and the sun screen.

For increasing the effectiveness of the engagement between the housing and said extreme end, said extreme end of said part of the sun screen may comprise reinforcement means to increase its resiliency.

The manner in which such reinforcement means are embodied, may differ. In one embodiment of the rollo assembly said reinforcement means comprise at least one member attached to said extreme end. In such an embodiment said at least one member may be attached to said extreme end using any of the following manners, alone or in combination: adhesive, fusing, stitching.

In an other embodiment, however, said reinforcement means comprises a part of the extreme end folded back onto itself. In this embodiment the reinforcement means basically is not an additional, separate member, but is defined by the sun screen.

However, also when said reinforcement means comprises a part of the extreme end folded back onto itself, in one embodiment a reinforcing member may be sandwiched between said extreme end and the folded back part of the extreme end.

The extreme end and the folded back part of the extreme part may be attached to each other using any of the following manners, alone or in combination: adhesive, fusing, stitching. This may apply too for a situation in which a reinforcing member is sandwiched between said extreme end and the folded back part of the extreme end.

Whereas the embodiments comprising a reinforcement means described above all feature mechanical means for achieving a reinforcement, such a reinforcement also may be achieved in a different way, for example when the reinforcement means comprise an impregnation of the said extreme end. Using such an impregnation may cause a local change (generally increase) of the resiliency of said extreme end.

In yet another embodiment of the rollo assembly, the operating beam at its side facing the housing is provided with an open channel for receiving a loop shaped portion of said extreme end of said part of the sun screen, wherein further an elongate locking member is provided for locking said loop shaped portion in said channel.

The cooperation between the loop shaped portion of the sun screen, open channel and elongate locking member (as based, among others, upon the shape, dimensions and relative position of said parts) may be used to control the direction in which the extreme end extends away from the operating beam. Such a locking function using an elongate locking member (for example a chord) is known per se, for example on the field of insect screens, and allows an easy assembly with reduced cost, but nevertheless very effective locking result.

It should be noted, however, that the sealing member in general, and the extreme end of the sun screen in particular, may be attached to the operating beam in any other way, if required.

In one embodiment the housing may be provided with a counter means for cooperation with the sealing member when the sun screen is maximally wound onto the winding shaft. Such a counter means may be a specific local shape of the housing or may be a separate part attached thereto in any appropriate manner and will cooperate with the sealing member for enhancing or promoting the sealing effect.

In a second aspect the present invention relates to an open roof construction for a vehicle, comprising a roof opening provided in a stationary roof part, a movable panel for closing and at least partially opening said roof opening and a rollo assembly.

The movable panel of such an open roof construction may comprise, for example, a tilting and/or sliding panel or a tilting wind deflector.

The housing of the winding shaft may comprise a separate member. However, in a specific embodiment of the open roof construction the roof opening is surrounded by a frame part wherein the housing receiving the winding shaft of the rollo assembly at least partially is defined by said frame part. As a result, the housing may be defined, at least partially, by a part of the open roof construction already present (although, possibly, with some amendments of said part).

It is noted that the housing receiving the winding shaft not necessarily has to be fully closed (apart from the opening for the passage of the sun screen).

BRIEF DESCRIPTION OF THE DRAWINGS

Hereinafter aspects of the invention will be elucidated while referring to the drawing, in which.

DETAILED DESCRIPTION OF THE
ILLUSTRATIVE EMBODIMENTS

Figure 1:
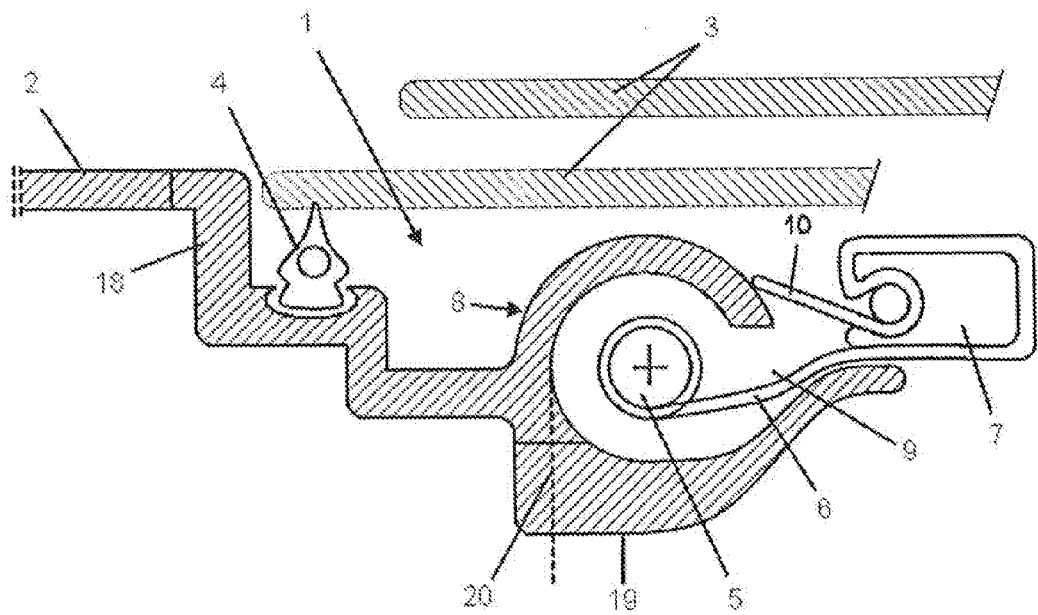
FIG. 1 schematically shows a longitudinal cross section of an embodiment of an open roof construction with rollo assembly.

In FIG. 1 a longitudinal cross section is illustrated of part of an open roof construction for a vehicle. It basically comprises a roof opening 1 provided in a stationary roof part 2 of the vehicle. A movable panel 3 is provided for closing and at least partially opening said roof opening 1. The movable panel 3 has been represented in broken lines in its position for fully closing the roof opening 1 (in which it may cooperate with a seal 4) and in full lines in a position for at least partially freeing the roof opening 1. The movement of the movable panel 3 will depend from its type (sliding and/or tilting panel, wind deflector) and may be caused manually or by an electric motor.

The open roof construction further is provided with a rollo assembly. This rollo assembly basically comprises a rotatable winding shaft 5 and a flexible sun screen 6 having forward and rearward ends. The rearward end of the sun screen 6 can be wound on or off the winding shaft 5 (which may be driven in any known manner, for example being spring loaded by a torsion spring not illustrated but known per se). The forward end of the sun screen is provided with an operating beam 7 (which, as is known per se for this kind of rollo assemblies, may have opposite ends guided in stationary guides—not illustrated—extending along opposite sides of the roof opening 1 and which may be operated manually).

The winding shaft 5 is received in a housing 8 that comprises an opening 9 for the passage of the sun screen 6. This opening 9 has a length (as seen in a direction perpendicularly to the plane of FIG. 1) which at least substantially corresponds with a transversal width of the sun screen 6. The sun screen 6 passes through this opening 9 from the winding shaft 5 towards the operating beam 7. It is possible that at least one edge (for example the lower edge) of said opening 9 also serves for guiding the sun screen 6.

As will be clear from the following description, the operating beam 7 at its side facing towards the housing 8 carries a sealing member 10 extending above the sun screen transversally over a length at least substantially corresponding with the length of the opening 9 in the housing 8, for engaging the housing when the sun screen is maximally wound onto the winding shaft.

Figure 2:
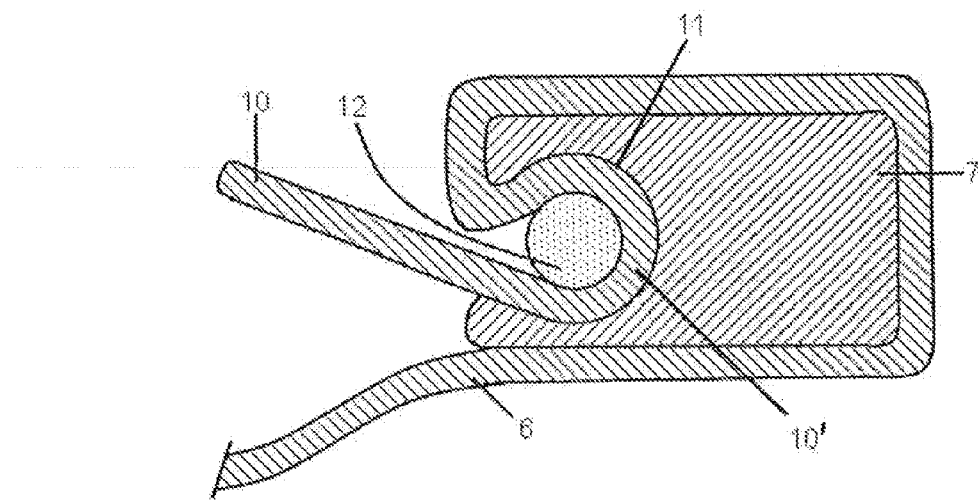
FIG. 2 shows a detail of the embodiment illustrated in FIG. 1 on a larger scale.

As is illustrated on a larger scale in FIG. 2, in one embodiment said sealing member 10 basically comprises the extreme end of a part of the sun screen 6 extending around the operating beam 7. This extreme end 10 substantially extends in an upwardly inclined manner in a direction towards the housing 8 (not illustrated in FIGS. 2-5).

The operating beam 7 at its side facing the housing 8 is provided with an open channel 11 for receiving a loop shaped portion 10' of said extreme end 10 of said part of the sun screen 6. An elongate locking member 12 (for example a flexible chord, such as a rubber chord) is provided for locking said loop shaped portion 10' in said channel 11.

The cooperation between the loop shaped portion 10' of the extreme end 10 the sun screen 6, open channel 11 and elongate locking member 12 (as based, among others, upon the shape, dimensions and relative position of said parts) may be used to control the direction in which the extreme end 10 extends away from the operating beam 7. This cooperation may also be used to control the resiliency of the extreme end 10.

Figure 3:
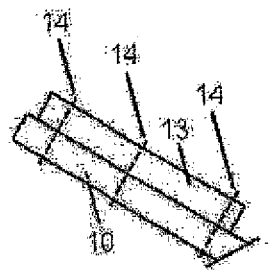
FIGS. 3-5 show alternative embodiments of the extreme end of the sun screen.
Figure 4:
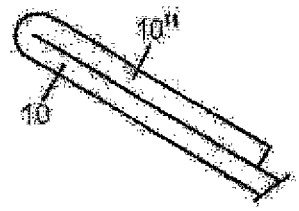
Figure 5:
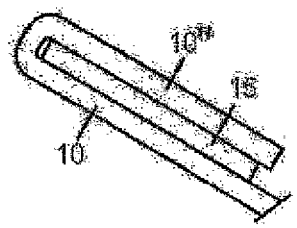

Next reference is made to FIGS. 3-5 which illustrate different embodiments of a rollo assembly wherein the extreme end 10 of the sun screen 6 comprises reinforcement means to increase its resiliency. It is noted that these figures only illustrate said extreme end.

In FIG. 3 said reinforcement means comprise at least one member 13 attached to said extreme end 10. For such an attachment any method may be used, among which, alone or in combination: adhesive, fusing or stitching 14. This member may comprise any appropriate material (stiff or flexible, different from or equivalent to the sun screen material).

FIG. 4 illustrates an alternative embodiment, in which said reinforcement means comprises a part 10'' of the extreme end 10 folded back onto itself. FIG. 5 likewise comprises such a folded back part 10'', but now an additional reinforcing member 15 is sandwiched between said extreme end 10 and the folded back part 10" of the extreme end.

As a further alternative, or even in addition to any of the embodiments previously described, the reinforcement means may comprise an impregnation of the said extreme end 10 (not illustrated) or any other manner for increasing the resiliency of the extreme end 10 (for example locally increasing the thickness of the sun screen 6).

Figure 6:
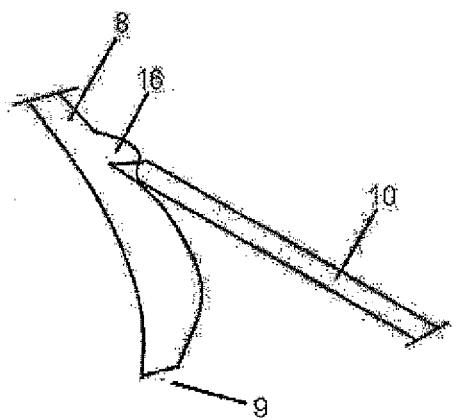
FIGS. 6 and 7 show two different embodiments of counter means on the housing for the winding shaft.
Figure 7:
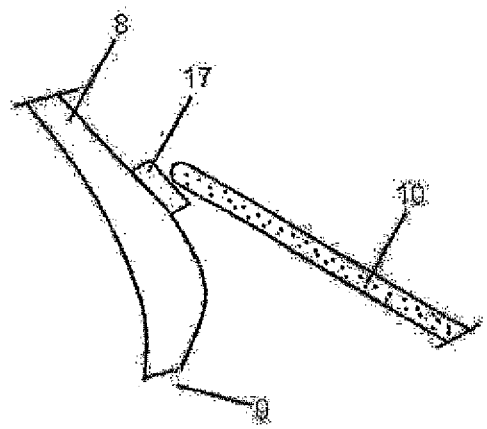

Finally FIGS. 6 and 7 show embodiments in which the housing 8 is provided with a counter means for cooperation with the sealing member 10 when the sun screen 6 is maximally wound onto the winding shaft 5. In FIG. 6 said counter means comprises a ridge 16 integrally formed with the housing and providing a shelter for the tip of the extreme end 10, thus minimising the risk of foreign particles (such as dust) reaching the opening 9 by entering between the housing 8 and extreme end 10. The ridge also may be a separate part attached to the housing in any convenient manner.

FIG. 7 illustrates a counter means 17 defining a pad against which the extreme end 10 may rest. Such a pad 17 may be softer than the material of the housing 8 to improve the sealing effect of the extreme end 10.

The invention is not limited to the embodiments described before which may be varied in many ways within the scope of the invention as defined by the appending claims.

For example, as illustrated in FIG. 1, the roof opening 1 may be surrounded by a frame part 18 and the housing 8 receiving the winding shaft 5 of the rollo assembly at least partially is defined by said frame part. In the illustrated embodiment an other part of the housing 8 is defined by a cover part 19 releasably connected to the frame part 18 (for example using screws or bolts 20). Such a cover part allows an easy mounting of the winding shaft 5 into the housing 8.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A rollo assembly, comprising:
    a rotatable winding shaft;
    a flexible sun screen having forward and rearward ends, wherein the rearward end of the sun screen winds on or off the winding shaft and wherein the forward end of the sun screen is provided with an operating beam; and
    a housing, the winding shaft mounted in the housing that comprises an opening for the passage of the sun screen with a length at least substantially corresponding with a transversal width of the sun screen, wherein the operating beam at a side facing towards the housing carries a sealing member having a flexible and resilient edge portion extending in a direction substantially toward the housing and spaced a distance from the sun screen adjacent the operating beam transversally over a length at least substantially corresponding with the length of the opening in the housing, the sealing member engaging the housing proximate the opening therein when the sun screen is maximally wound onto the winding shaft.

2. The rollo assembly according to claim 1, wherein the sealing member is disposed at an extreme end of a part of the sun screen extending around the operating beam, which extreme end substantially extends in a direction towards the housing.

3. The rollo assembly according to claim 2, wherein said extreme end of said part of the sun screen extends in an upwardly inclined manner.

4. The rollo assembly according to claim 2, wherein the extreme end of said part of the sun screen comprises a reinforcement to increase its resiliency.

5. The rollo assembly according to claim 4, wherein said reinforcement comprises at least one member attached to said extreme end.

6. The rollo assembly according to claim 5, wherein said at least one member is attached to said extreme end using any of the following manners, alone or in combination: adhesive, fusing, stitching.

7. The rollo assembly according to claim 4, wherein said reinforcement comprises a part of the extreme end folded back onto itself.

8. The rollo assembly according to claim 7, wherein a reinforcing member is sandwiched between said extreme end and the part of the extreme end folded back.

9. The rollo assembly according to claim 7, wherein the extreme end and the part of the extreme end folded back are attached to each other using any of the following manners, alone or in combination: adhesive, fusing, stitching.

10. The rollo assembly according to claim 4, wherein the reinforcement comprises an impregnation of the said extreme end.

11. The rollo assembly according to claim 2, wherein the operating beam at the side facing the housing is provided with an open channel configured to receive a loop shaped portion of said extreme end of said part of the sun screen, wherein further an elongate locking member locks said loop shaped portion in said channel.

12. The rollo assembly according to claim 1, wherein the housing is provided with a counter member configured to cooperate with the sealing member when the sun screen is maximally wound onto the winding shaft.

13. An open roof construction for a vehicle, comprising a roof opening provided in a stationary roof part, a movable panel for closing and at least partially opening said roof opening and a rollo assembly comprising:
    a rotatable winding shaft;
    a flexible sun screen having forward and rearward ends, wherein the rearward end of the sun screen winds on or off the winding shaft and wherein the forward end of the sun screen is provided with an operating beam; and
    a housing, the winding shaft mounted in the housing that comprises an opening for the passage of the sun screen with a length at least substantially corresponding with a transversal width of the sun screen, wherein the operating beam at a side facing towards the housing carries a sealing member having an edge portion fixed at one end and extending freely in a direction substantially toward the housing and spaced apart from a portion of the sun screen adjacent the operating beam transversally over a length at least substantially corresponding with the length of the opening in the housing, the sealing member engaging the housing when the sun screen is maximally wound onto the winding shaft.

14. The open roof construction according to claim 13, wherein the roof opening is surrounded by a frame part and wherein the housing receiving the winding shaft of the rollo assembly at least partially is defined by said frame part.

15. The rollo assembly of claim 1, wherein the sealing member extending in the direction substantially toward the housing and the portion of the sun screen adjacent the operating beam define an acute angle.

* * * * *